(12) United States Patent
Chung

(10) Patent No.: US 7,452,008 B2
(45) Date of Patent: Nov. 18, 2008

(54) FEED SCREW COUPLING FOR THE BASE OF HYBRID OUTLET SPIGOT

(76) Inventor: Chiu-Chih Chung, No. 31, Lane 275, Sec. 4, Lu Ho Rd., Lu Kan Chen, Chunghua Hsien (TW)

( * ) Notice: Subject to any disclaimer, the term of this patent is extended or adjusted under 35 U.S.C. 154(b) by 402 days.

(21) Appl. No.: 11/143,622

(22) Filed: Jun. 3, 2005

(65) Prior Publication Data

US 2008/0007063 A1 Jan. 10, 2008

(51) Int. Cl.
*F16L 19/00* (2006.01)
(52) U.S. Cl. ............................ 285/354; 285/386; 4/677; 4/676
(58) Field of Classification Search ................. 285/354, 285/386, 388; 4/677, 678, 676
See application file for complete search history.

(56) References Cited

U.S. PATENT DOCUMENTS

| | | | | | |
|---|---|---|---|---|---|
| 2,754,137 | A | * | 7/1956 | Gine et al. ................... | 285/302 |
| 4,262,699 | A | * | 4/1981 | Fabian ........................... | 4/677 |
| 4,953,236 | A | * | 9/1990 | Lee et al. ....................... | 4/677 |
| 5,062,164 | A | * | 11/1991 | Lee et al. ....................... | 4/677 |
| 5,718,464 | A | * | 2/1998 | Mark .......................... | 285/354 |

* cited by examiner

*Primary Examiner*—David E Bochna
(74) *Attorney, Agent, or Firm*—Troxell Law Office, PLLC

(57) ABSTRACT

The feed screw coupling for a base of a hybrid outlet spigot including a water control spigot located on a granite counter and an inlet pipe fixed on the bottom of water control spigot by a thread insert. A locking thread insert is set in advance of an inlet coupling of inlet pipe, and a locking groove is located on the ring-shaped edge near the top side of the inlet coupling; and a C-type ring is embedded on the locking groove and locking the locking thread insert on the thread section of the water control spigot. An angle of in let pipe can be adjusted to make it parallel with the water control spigot while locking tightly while locking the thread insert.

2 Claims, 4 Drawing Sheets

FEED SCREW COUPLING FOR THE BASE OF HYBRID OUTLET SPIGOT

BACKGROUND OF THE INVENTION

1) Field of the Invention

A feed screw coupling for the base of hybrid outlet spigot, in which a locking thread insert is set in advance in an inlet coupling of inlet pipe, and a locking groove is available on the ring-shaped edge near the top side of the inlet coupling; and a C-type ring is embedded on the locking groove to make the locking thread insert locked on the thread section of the water control spigot; moreover, the angle of the inlet pipe can be adjusted to make it be in parallel with the water control spigot in the case of locking tightly while locking the thread insert. In accordance with the forgoing structure, the circumstance of locking the inlet pipe forcibly and broken pipeline can be avoided, besides the circumstance of inconsistent interval between the both ends of the inlet pipe away the wall to produce difficult water supply.

2) Description of the Prior Art

Generally, the prior feed screw coupling for the base of hybrid outlet spigot, referring to FIG. 1, is composed of a water control spigot 1 in advance designed on the granite counter and an inlet pipe fixed at the bottom of the water control spigot by a thread insert; in which a thread section 11 is designed at the bottom of the water control spigot 1, and the inlet pipe extrudes to form an inlet coupling 51 with a thread surface. Moreover, a thread insert 6 is designed between the thread section 11 of the water control spigot and the inlet coupling 51 to make the thread surface 11 in the thread insert exactly can be locked with the thread surfaces 11 of the water control spigot and the inlet coupling 51 respectively, and so as to lock the inlet pipe 5 at the bottom of the water control spigot 1;

Nevertheless, because the water control spigot 1 and inlet pipe 5 are locked by the two ends of the thread insert 6, may be the angle of the inlet pipe 5 would not exactly aim at the water control spigot 1 after their tight locking. Accordingly, the inlet pipe should be locked forcibly to make the angle of the inlet pipe 5 be aimed at the water control spigot 1. However, under this circumstance, the pipeline would be broken for over tightening and bring difficulty with installation.

Furthermore, because the angle of the inlet pipe 5 fails to aim at the water control spigot 1 accurately, the inconsistent interval between the both ends of the inlet pipe and wall would be produced and causes that the end with smaller interval and makes the inlet pipe touch the wall easily when the water control spigot activates the water, and produce difficult water supply.

SUMMARY OF THE INVENTION

The feed screw coupling for the base of hybrid outlet spigot the prevent invention provides, is composed of a water control spigot on the granite counter and an inlet pipe fixed on the bottom of water control spigot by a thread insert. In which a locking thread insert is set in advance in an inlet coupling of inlet pipe, and a locking groove is available on the ring-shaped edge near the top side of the inlet coupling; and a C-type ring is embedded on the locking groove to make the locking thread insert locked on the thread section of the water control spigot; moreover, the angle of inlet pipe can be adjusted to make it be in parallel with the water control spigot in the case of locking tightly while locking the thread insert. In accordance with the forgoing structure, the circumstance of locking the inlet pipe forcibly and broken pipeline can be avoided, besides the circumstance of inconsistent interval between the both ends of the inlet pipe and wall to produce difficult water supply.

DETAILED DESCRIPTION OF THE PREFERRED EMBODIMENTS

Figure 1:
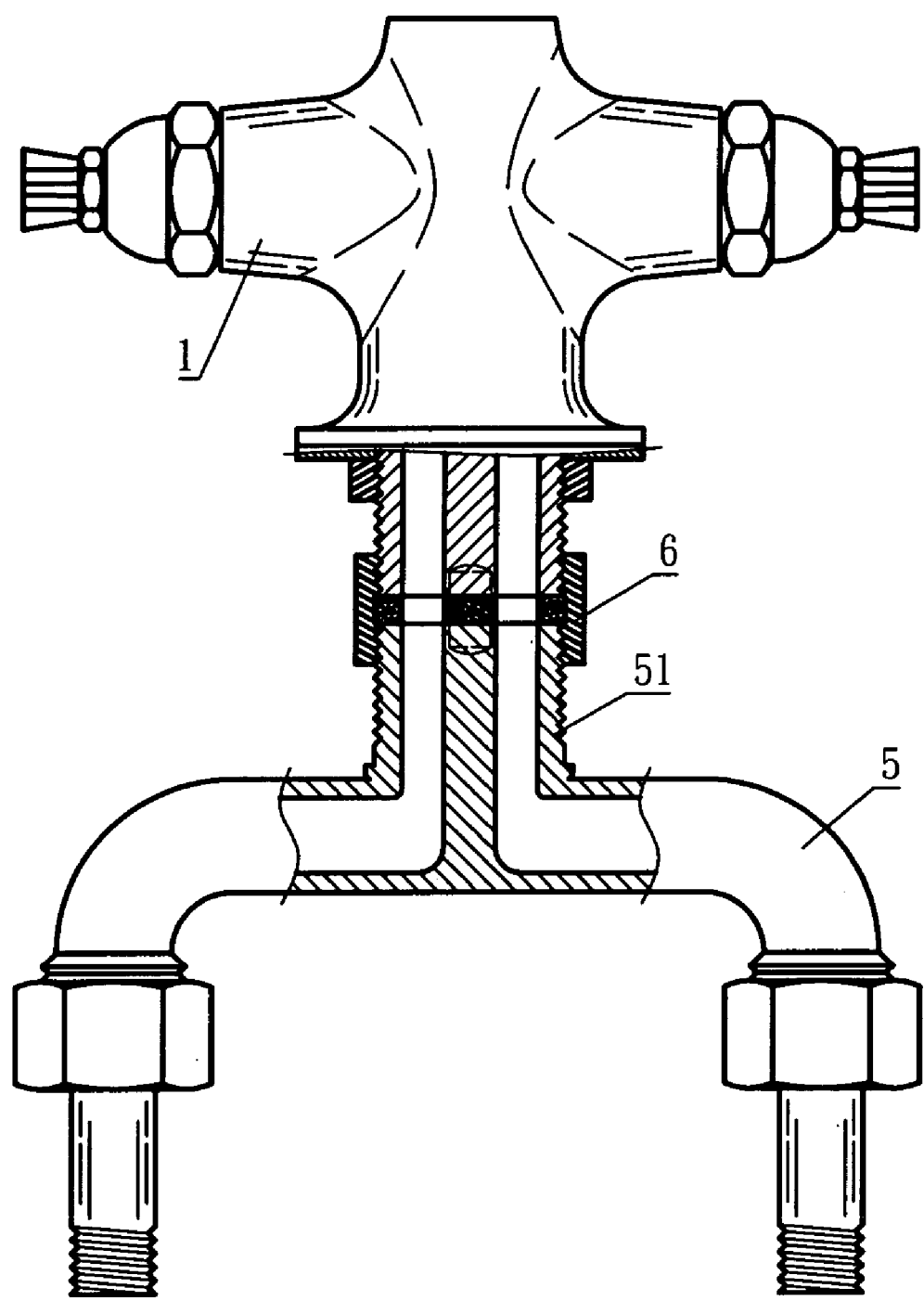
FIG. 1 is the plane cutaway view of the prior art.
Figure 2:
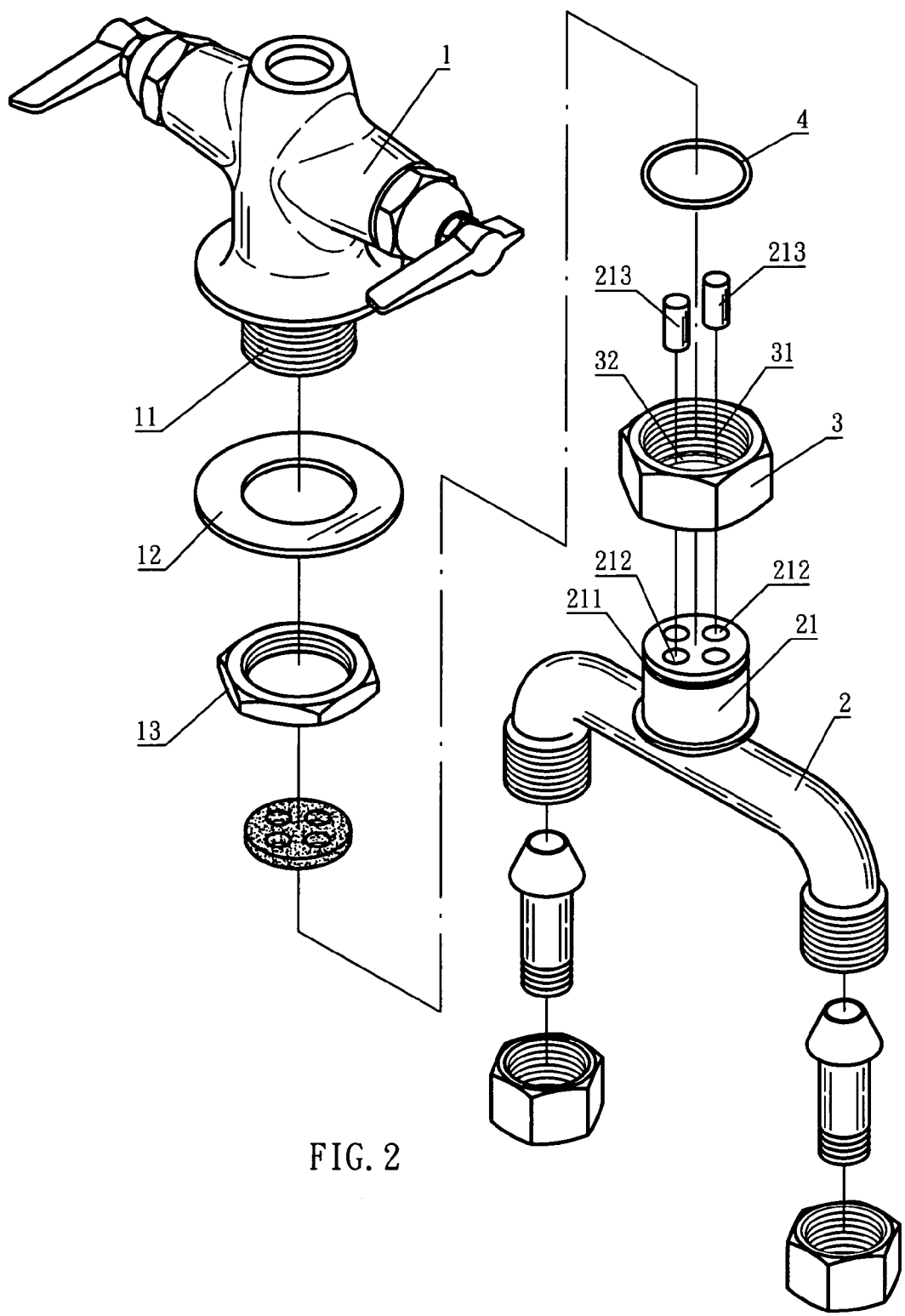
FIG. 2 is the three-dimensional exploded view of the present invention.
Figure 3:
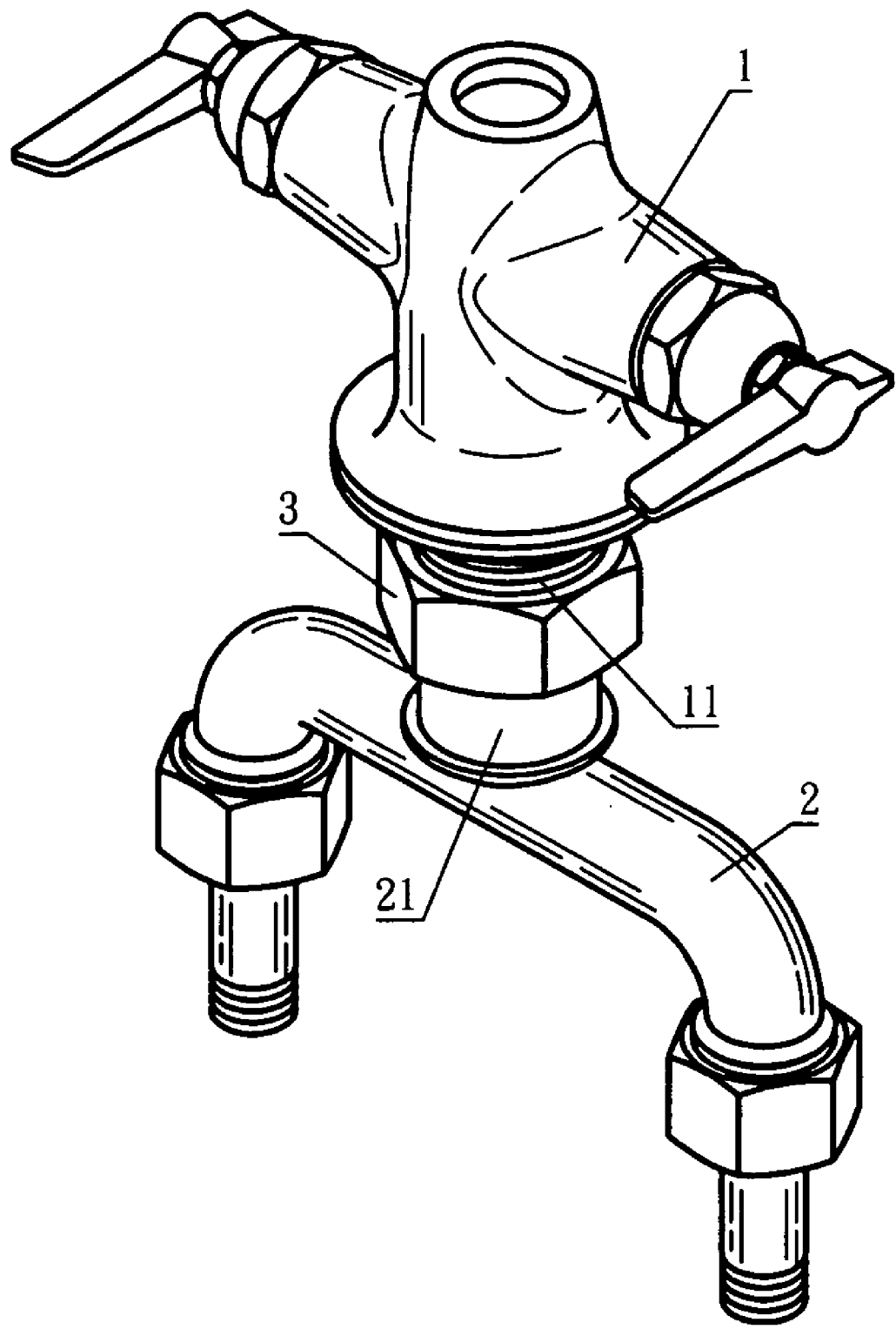
FIG. 3 is the three-dimensional combination diagram of the present invention.
Figure 4:
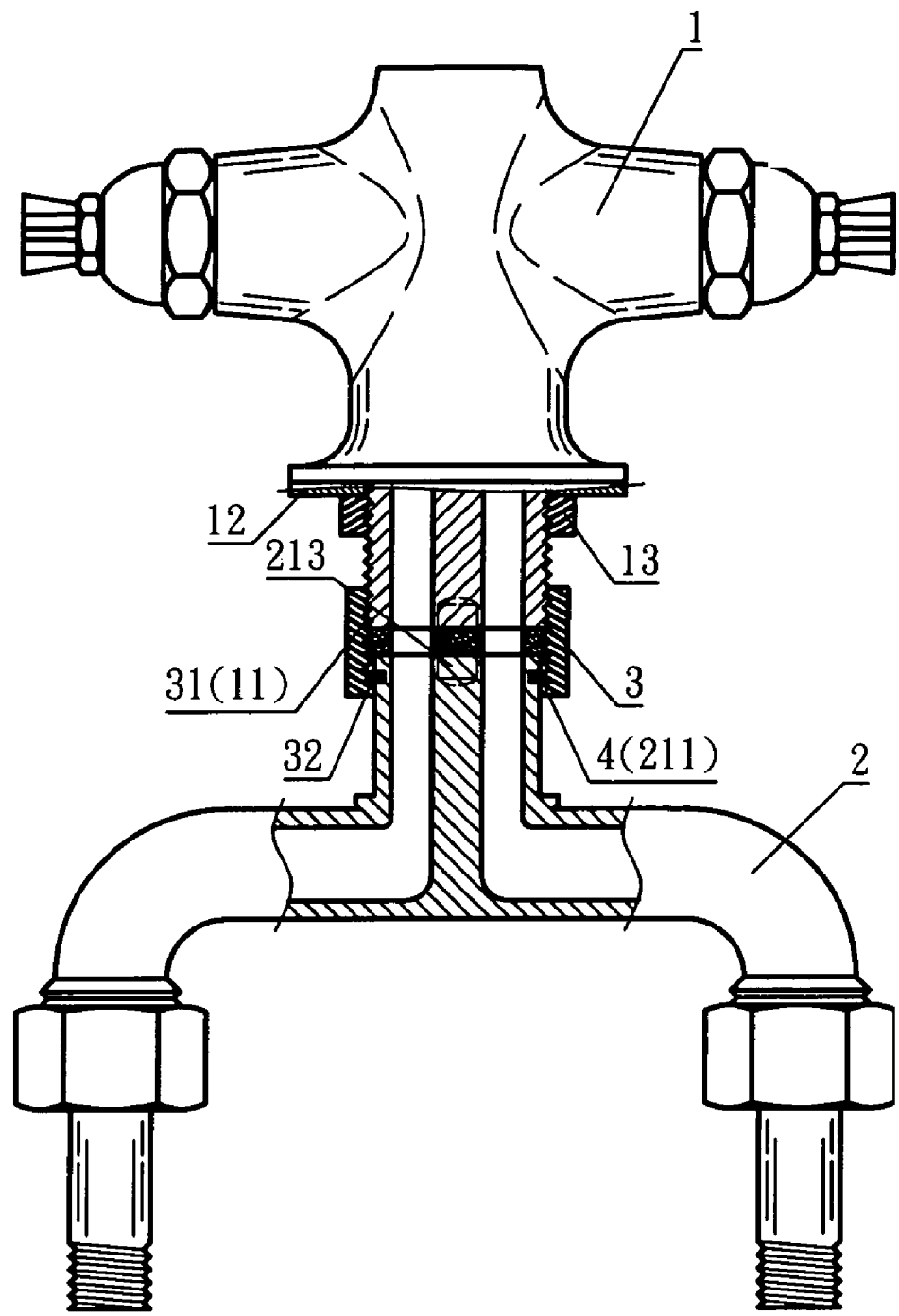
FIG. 4 is the plane cutaway view of the present invention.

Referring to FIGS. 2-4, the structure of the present invention is illustrated and includes a water control spigot 1 on the granite counter and an inlet pipe 2 fixed at the bottom of water control spigot 1 by a thread insert 3.

A thread section 11 is designed at the bottom of the water control spigot 1, which is put through and fixed on the granite counter in advance with a shim 12 and position screw cap 13.

A top end of the inlet pipe 2 extrudes to form a ring-shaped inlet coupling 21 with a vertical surface, and some holes 212 are available at the upper side of the inlet coupling 1. In either two holes, some pins 213 are available to lock the angle of the inlet pipe 2 and limit the water to flow from another two holes. A locking thread insert 3 is set in advance on the inlet coupling 21, and a locking groove 211 is designed on the ring-shaped edge near the top side of the inlet coupling 21. A C-type ring 4 is embedded on the locking groove, which exactly extrudes the outer edge of the inlet coupling 21. So that the locking thread insert 3 can move up and down on the ring-shaped surface of the inlet coupling 21 and is locked at the thread section 11 of the water control spigot 1 to fix the inlet pipe 2 at the bottom of the water control spigot 1.

The locking thread insert 3 has a thread surface 31, which can exactly lock the thread section 11 of the water control spigot 1, and an extruded ring-shaped blocking edge 32 at the bottom of the locking thread insert 3, so that the ring-shaped blocking edge is locked on the C-type ring 4 of the inlet coupling to prevent the locking thread insert 3 from separating from the inlet coupling 21 while the locking thread insert 3 moves upwards.

Please refer to FIG. 3 for the installation methods, in which after the water control spigot 1 is fixed on the granite counter with the shim 12 and position screw cap 13, the thread section 11 of the water control spigot 1 extends out of the bottom of the granite counter. At this time, the thread section 11, aiming at the water control spigot 1 of the inlet coupling 21 of the inlet pipe 2, is locked with the one it aiming at the water control spigot 1 of the locking thread insert 3 outside the inlet coupling 21. The angle of inlet pipe 2 can be adjusted to make it be in parallel with the water control spigot 1 while locking the locking thread insert 3.

The angle of inlet pipe 2 can be adjusted to make it 2 be in parallel with the water control spigot 1 while locking the water control spigot 1 with the locking thread insert 3, so as to install it easily and avoid forcible locking (over-tightening) for corresponding angle of the water control spigot 1, and breakage of the pipeline.

Moreover, because the inlet pipe 2 of the hybrid outlet spigot is in parallel, the interval of both ends of the inlet pipe 2 away the wall is equal to avoid the inconsistent interval (that would cause the end to the smaller interval and make the inlet pipe touch the wall easily when the water control spigot activates the water, and produce difficult water supply).

What is claimed is:

1. A feed screw coupling for a base of a hybrid spigot comprising:
   a) a water control spigot having a threaded section located on a bottom thereof;
   b) an inlet pipe having a ring-shaped inlet coupling formed on a top thereof and having a top vertical surface, the ring-shaped inlet coupling has a locking groove;
   c) a retaining ring located in the locking groove of the inlet pipe; and
   d) a thread insert having internal threads and a ring-shaped blocking edge located on a bottom thereof, the thread insert is slidably located on the ring-shaped inlet coupling; the retaining ring securing the thread insert on the inlet pipe and limiting a sliding movement of the thread insert along the ring-shaped inlet, the internal threads of the thread insert are threadly connected to external threads of the threaded section of the water control spigot and the thread insert connecting the inlet pipe to a bottom of the water control spigot,
   wherein the inlet pipe has a plurality of sets of holes and a set of pins inserted into one set of holes of the plurality of sets of holes.

2. The feed screw coupling according to claim 1, wherein the water control spigot has a shim and a position screw cap located on the threaded section thereof.

* * * * *